3,641,134
OXY SUBSTITUTED BIPHENYLENE
CARBOXYLIC ACIDS
Tsung-Ying Shen, Bruce E. Witzel, and Gordon L. Walford, Westfield, N.J., assignors to Merck & Co., Inc., Rahway, N.J.
No Drawing. Continuation-in-part of application Ser. No. 836,659, June 25, 1969. This application Apr. 20, 1970, Ser. No. 30,293
Int. Cl. C07c 65/14
U.S. Cl. 260—520
7 Claims

ABSTRACT OF THE DISCLOSURE

New substituted biphenylene carboxylic acids and non-toxic pharmaceutically aceptable salts, esters, anhydrides, and amides derived therefrom. The substituted biphenylene carboxylic acids described herein have anti-inflammatory, anti-pyretic, and analygesic activity. Also included is a method of preparing said carboxylic acids.

CROSS REFERENCE TO RELATED APPLICATIONS

This application is a continuation-in-part of our copending U.S. application S.N. 836,659 filed June 25, 1969, now abandoned.

BACKGROUND OF THE INVENTION

The deevlopment of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

SUMMARY OF THE INVENTION

Generally, this invention relates to new substituted biphenylene carboxylic acid compounds and processes for producing the same. These compounds are useful in that they have anti-inflammatory activity and are effective in the prevention and inhibition of edema and granuloma tissue formation. In addition, some of them have a useful degree of anti-pyretic, analgesic, diuretic, antifibrinolytic and hypo-glycemic activity.

DESCRIPTION AND PREFERRED EMBODIMENTS

This invention relates to new substituted biphenylene carboxylic acids and processes for producing the same. More specifically, this invention relates to substituted biphenylene carboxylic acids, esters, amides, anhydrides and non-toxic pharmaceutically acceptable salts thereof. Still more specifically, this invention relates to compounds having the following general formula:

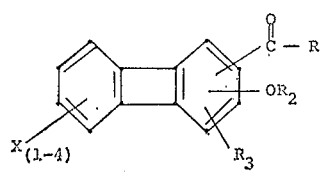

wherein:
R may be hydroxy, amino, loweralkoxy (such as methoxy, ethoxy, butoxy, pentoxy, etc.), loweralkylamino (methylamino, propylamino, pentylamino, etc.), di(loweralkyl)amino (dimethylamino, dibutylamino, propylpentylamino, etc.), diloweralkylaminoloweralkyl, diloweralkylaminoloweralkoxy, hydroxyloweralkoxy (3 - hydroxypropoxy, 2-hydroxypropoxy, 4-hydroxybutoxy etc.), polyhydroxyloweralkoxy (2,3-dihydroxypropoxy, 2,3,4,5,6 - pentahydroxyhexyloxy, etc.), loweralkoxylower alkoxy (ethoxyethoxy), phenylloweralkoxy (benzyloxy, phenethoxy, etc.), phenoxy, substituted phenoxy (such as loweralkoxyphenoxy, diloweralkylaminophenoxy, loweralkanoylaminophenoxy, carboxyphenoxy, carboloweralkoxyphenoxy, etc.), hydrazino, morpholino, piperidino, pyrrolidino or hydroxyloweralkylamino;

$R_2$ may be hydrogen, acyl (preferably lower acyl such as formyl, acetyl, propionyl, butyryl, etc.), alkyl (preferably loweralkyl such as methyl, ethyl, propyl, isopropyl, butyl, pentyl, etc.), or alkoxy carbonyl (preferably loweralkoxy carbonyl such as methoxycarbonyl, ethoxycarbonyl, etc.);

$R_3$ may be hydrogen, halogen (such as chloro, bromo, fluoro, or iodo, preferably fluoro or chloro), haloalkyl (preferably haloloweralkyl such as chloromethyl, bromomethyl, trifluoromethyl, etc.), alkyl (preferably loweralkyl, such as methyl, ethyl, propyl, isopropyl, butyl, pentyl, etc.), cycloalkyl (cyclobutyl, cyclopentyl, cyclohexyl and cycloheptyl), or alkoxy preferably loweralkoxy such as methoxy, ethoxy, isopropoxy or butoxy); and X may be hydrogen, alkyl, (preferably loweralkyl, such as methyl, ethyl, propyl, isopropyl, butyl, pentyl, etc.), hydroxy, alkoxy (preferably loweralkoxy such as methoxy, ethoxy, isopropoxy or butoxy, etc.), acyloxy (such as benzoyloxy, acetoxy or propionoxy), halogen (such as chloro, bromo, fluoro or iodo, preferably fluoro or chloro), haloalkyl (preferably haloloweralkyl such as chloromethyl, bromomethyl, trifluoromethyl, etc.), nitro, amino, alkylamino (preferably loweralkylamino such as methylamino, propylamino, pentylamino, etc.), diloweralkylamino preferably dimethylamino, dibutylamino, propylpentylamino, etc.), acylamino (preferably loweracylamino such as formylamino, acetylamino, propionylamino, butyrylamino, etc.), mercapto, alkylmercapto preferably loweralkylmercapto such as methylmercapto, ethylmercapto, etc.), alkylsulfinyl (preferably loweralkylsulfinyl such as methylsulfinyl, ethylsulfinyl, butylsulfinyl, etc.), alkylsulfonyl (preferably loweralkylsulfonyl such as methylsulfonyl, ethylsulfonyl, butylsulfonyl, etc.), sulfonamido, sulfonylamido, alkylaminoalkyl (preferably loweralkylaminoloweralkyl such as methylaminomethyl, ethylaminomethyl, etc.), hydroxyalkyl (preferably hydroxyloweralkyl such as hydroxymethyl, hydroxyethyl, hydroxypropyl, etc.), alkoxyalkyl (preferably loweralkoxyloweralkyl such as methoxymethyl, methoxyethyl, ethoxyethyl, ethoxypropyl, etc.), mercaptoalkyl (preferably mercaptoloweralkyl such as mercaptomethyl, mercaptoethyl, etc.), alkylmercaptoalkyl (preferably loweralkylmercaptoloweralkyl such as methylmercaptomethyl, ethylmercaptoethyl, ethylmercaptopropyl, etc.), cyano, carboxy, carboalkoxy preferably carbomethoxy, carboethoxy, etc.), carboamyl, aryl, (such as phenyl, tolyl, salicyl), aralkyl such as benzy(l), aryloxy or arylalkoxy.

provided that the $OR_2$ group is always ortho to the

group.

Representative compounds of this invention are:

3-hydroxybipenhylene-2-carboxylic acid;
7-chloro-3-hydroxybiphenylene-2-carboxylic acid;
7-fluoro-3-hydroxybiphenylene-2-carboxylic acid;
7-methoxy-3-hydroxybiphenylene-2-carboxylic acid;
7-trifluoromethyl-3-hydroxybiphenylene-2-carboxylic acid;

7-amino-3-hydroxybiphenylene-2-carboxylic acid;
7-dimethylamino-3-hydroxybiphenylene-2-carboxylic acid;
6-methylthio-3-hydroxybiphenylene-2-carboxylic acid;
6-methylsulfinyl-3-hydroxybiphenylene-2-carboxylic acid;
6-methylsulfonyl-3-hydroxybiphenylene-2-carboxylic acid;
3,6-dihydroxybiphenylene-2-carboxylic acid;

and the corresponding anhydrides, esters, amides and salts derived therefrom.

We have found that the compounds described above have anti-inflammatory activity and are effective in the prevention and inhibition of edema and granuloma tissue formation. In addition, some of them have a useful degree of anti-pyretic, analgesic, diuretic, anti-fibrinolytic and hypo-glycemic activity. For these purposes they are alternately admiistered in tablet and capsule form, the optimum dosage depending on the severity of the condition of the patient being treated. Although the optimum quantity being used will depend on the compounds employed, oral dosage levels of the preferred compound in the range of 50 mg. to 10 mg. per day are useful in the control of said condtions, depending on the activity of the specific compound and the reaction sensitivity of the patient.

The acid compounds of this invention may be prepared by carboxylating the appropriate substituted hydroxybiphenylene. This can be accomplished by heating the appropriate substituted biphenylene under pressure with carbon dioxide gas. The product can then be isolated from the reaction mixture by methods known in the art. The temperature at which the carboxylation reaction can take place is from 50° to 300° C. The reaction can also take place at from atmospheric pressure to high pressure, preferably however at 200° C., and at about 1600 p.s.i. pressure.

These acid compounds may also be prepared by oxidation of the known 2-formyl-3-hydroxybiphenylene compounds, by the ring closure of the appropriately substituted biphenyl compound, or by other methods known to the art, as through the Fries rearrangement of esters, the Grignard or Lithio compound, etc.

The compounds of this invention wherein R is a group such that an ester is the final compound (i.e. R is alkoxy) are prepared by any esterification procedure using an esterifying agent containing the appropriate R group. For example, the carboxylic acid compounds of this invention may be reacted with the appropriate loweralkanol (preferably methanol) in the presence of a strong acid such as hydrochloric acid, sulfuric acid, p-toluene-sulfonic acid, and the like to form the desired R compound. The reaction may occur at room temperature over an extended period of time or at elevated temperatures.

The compounds of this invention wherein R is a group such that an amide is the final compound (i.e. R is amino) may be prepared by any suitable amidation reaction. For example, the carboxylic acid compound (preferably the methyl or ethyl ester) may be reacted with ammonia, ammonium hydroxide, or an amide compound, at any suitable temperature (room temperature to reflux). When the amino group is desired, it is preferred to carry out the reaction with ammonia in a bomb at temperatures above 100° C. to form the desired R (amino) compound. Preferably, when an amide is desired which is derived from an amino acid, the following reaction sequence is followed: The carboxylic acid final compound is reacted with isobutyl chlorocarbonate to form mixed anhydride. This compound is in turn reacted with the desired amino acid ester and subsequently hydrolyzed to form the desired amide.

The salts of the final acid compounds of this invention may be prepared by any of the well-known metathesis procedures. For example, the carboxylic acid compound may be reacted with an inorganic base such as sodium hydroxide, potassium hydroxide, ammonium hydroxide and barium hydroxide and the like. The anhydride of this invention may be prepared by any of the well-known procedures in the art.

The following examples are presented to further illustrate the invention:

EXAMPLE 1

The preparation of 1-hydroxybiphenylene-2-carboxylic acid

An intimately ground mixture of 1-hydroxybiphenylene (1.0 g.) and anhydrous potassium carbonate (3.0 g.) is carbonated at 200° C. at a carbon dioxide atmosphere of 1500–2000 p.s.i. for ten hours. The reaction mixture is added to water (100 cc.) and washed with ether. The aqueous solution is filtered and acidified with 2.5 N hydrochloric acid. The 1-hydroxybiphenylene-2-carboxylic acid M.P. 200.5° C. is collected and dried.

Alternatively, the Lithio salt of the starting phenol may be prepared from one equivalent of lithium hydroxide, and this salt carbonated and worked-up as above as the acid.

When 2-hydroxybiphenylene is used in place of 1-hydroxybiphenylene in the above reaction, the corresponding carboxylic acids are obtained.

EXAMPLE 2

The preparation of 1-acetoxybiphenylene-2-carboxylic acid

To a mixture of 1-hydroxybiphenylene-2-carboxylic acid (0.008 m.) in anhydrous pyridine (3 ml.) is added acetic anhydride (5.6 ml.) and the resultant mixture heated on the steam cone for 1.5 hours. The mixture is kept free from moisture during this time. On cooling, the mixture is added to a stirred 100 ml. portion of water, the aqueous system extracted with ether, the ether layers washed with 1 N hydrochloric acid, water, and then dried over anhydrous magnesium sulfate. Concentration of the filtered ether solution yields 1-acetoxzy-biphenylene-2-carboxylic acid.

When propionic or butyric anhydride is used in place of acetic anhydride in the above cases, the corresponding acyloxy compound is obtained.

EXAMPLE 3

The preparation of 3-methoxybiphenylene-2-carboxylic acid

To 2-acetyl-3-methoxybiphenylene (0.1 g.) in dioxane (6 ml.) at 60° C. is added a solution of sodium hypochlorite (from 5 ml. $H_2O$ containing 0.5 g. sodium hydroxide and 0.35 g. $Cl_2$ and the resultant mixture heated on the steam cone for one hour. An additional portion of hypochlorite solution is added and the resultant mixture heated another 0.5 hour. The mixture is concentrated under reduced pressure to a residue, water added (15 ml.) the mixture filtered, acidified and the product, 3-methoxybiphenylene-2-carboxylic acid, collected.

EXAMPLE 4

The preparation of methyl-3-(2-carboxybiphenylenyl)-carbonate

To a mixture of 3-hydroxybiphenylene-2-carboxylic acid (0.001 m.), dimethylaniline (0.002 m.) and benzene (2 ml.) is added methyl chlorocarbonate (0.0011 m.) over one hour with constant shaking and cooling. When the odor of the chlorocarbonate is gone or remains very weak, hydrochloric acid (1 N, 10 ml.), is added and the mixture filtered. The funnel is washed with $CHCl_3$ and the washings added to the benzene portion, the organic layer dried, filtered and the solvent removed yielding methyl 3-(2-carboxybiphenylenyl)-carbonate.

EXAMPLE 5

The preparation of methyl 2-hydroxybiphenylene-3-carboxylate 3-hydroxybiphenylene-2-carboxylic acid (0.01 m.) is added to a solution of anhydrous methanol (25 ml.) containing 200 mg. of anhydrous hydrogen chloride. The resultant mixture is heated under gentle reflux for three hours, the solvent removed in vacuo, the residue partitioned between chloroform dilute sodium bicarbonate solution, and the layers separated. The chloroform layer is dried over anhydrous sodium sulfate, filtered and evaporated to leave methyl 2-hydroxybiphenylene-3-carboxylate. Sulfuric acid, phosphoric acid or any other strong acid may be used in place of the anhydrous hydrogen chloride.

When ethanol is used in place of methanol in the above reaction, the corresponding ethyl ester is produced.

EXAMPLE 6

The preparation of N,N-dimethylaminoethyl 3-hydroxybiphenylene-2-carboxylate

To a mixture of 3-hydroxybiphenylene-2-carboxylic acid (0.001 m.) and N,N-diethylethanolamine (0.001 m.) in anhydrous tetrahydrofuran (10 ml.) is added a solution of dicyclohexylcarbodiimide (0.001 m.) in a minimum of the same solvent. The mixture is stoppered, shaken well, and allowed to stand overnight with intermittent shaking. The precipitated dicyclohexylurea is removed by filtration, the tetrahydrofuran removed in vacuo, the residue partitioned between ether and 1 N hydrochloric acid, the layers separated, the aqueous layer washed one time with fresh ether, neutralized with saturated bicarbonate solution, extracted with chloroform, the chloroform solution dried, filtered, concentrated in vacuo and residue evacuated with a high vacuum pump to remove traces of diethylaminoethanol, leaving N,N-diethylaminoethyl 3-hydroxybiphenylene-2-carboxylate.

EXAMPLE 7

The preparation of 3-hydroxybiphenylene-2-carboxamide

Thionyl chloride (0.0011 m.) in benzene is added gradually to 3-hydroxybiphenylene-2-carboxylic acid (0.001 m.) in benzene (10 ml.), and the resultant mixture refluxed gently until the reaction is complete. The cooled solution is then added gradually to a vigorously stirred ice-cooled portion of concentrated ammonium hydroxide solution (25 ml.), the mixture allowed to warm to room temperature, the benzene layer removed under a stream of nitrogen, and the precipitated 3-hydroxybiphenylene-2-carboxamide collected and dried.

When aqueous methyl, dimethyl-, ethyl-, or diethyl- amines, or piperidine, morpholine or diethylaminoethyl- amine is used in place of ammonia in the above reaction, the corresponding substituted amide is obtained.

When methyl 3-hydroxybiphenylene-2-carboxylate is heated in methanolic or aqueous ammonia overnight, 3 - hydroxymethylbiphenylene - 2 - carboxamide is again obtained.

EXAMPLE 8

The preparation of sodium 3-hydroxybiphenylene-2-carboxylate

To a solution of sodium hydroxide (0.001 m.) in water (15 ml.) is added 3-hydroxybiphenylene-2-carboxylic acid (0.001 m.) in ethanol, the mixture stirred and gently heated for two hours, and the solvents removed in vacuo on a rotary evaporator to yield sodium 3-hydroxybiphenylene-2-carboxylate.

When potassium hydroxide is used in place of sodium hydroxide in the above example, the corresponding potassium salt is obtained.

EXAMPLE 9

The preparation of diethylaminoethanol salt of 3-hydroxybiphenylene-2-carboxylic acid N,N-diethylethanolamine (0.001 m.) in ether (5 ml.) is added to a stirred solution of 3-hydroxy-2-biphenylene-carboxylic acid in ether, the resultant mixture allowed to stir for one hour, the salt collected or the ether removed in vacuo to yield the diethylaminoethanol salt of 3-hydroxybiphenylene-2-carboxylic acid.

When piperidine, morpholine, triethylamine, N-methyl- piperidine, N-methylmorpholine tributylamine or other organic amines are used in place of diethylethanolamine in the above example, the corresponding salt is obtained.

EXAMPLE 10A

The preparation of 2-hydroxy-3-methoxybiphenylene

To 2-acetyl-3-methoxybiphenylene (0.001 m.) ln warm glacial acetic acid (4 ml.) is added gradually 40% peracetic acid (2.5 ml.) and the mixture stirred overnight at room temperature. Water is then added, the mixture extracted with ether, the ether solution dried, concentrated, and the residue chromatographed on a silica gel column using an ether-petroleum ether system (v./v. 0–10% ether) as eluant to yield 2-acetoxy-3-methoxybiphenylene.

The ester is hydrolyzed by gentle heating of an aqueous methanolic solution of it and sodium bicarbonate solution. The methanol is removed in vacuo, the organic material taken up in ether, dried, and the ether removed in vacuo to yield 2-hydroxy-3-methoxybiphenylene.

When 2-acetyl - 3 - methylbiphenylene and 2-acetyl-3- chlorobiphenylene (from Example 11) are used in place of the 3-methoxy compound in the above example, the corresponding 3-methyl- and 3-chloro-2-hydroxybiphenylenes are obtained.

EXAMPLE 10B

The preparation of 2-hydroxy-3-methoxybiphenylene-1-carboxylic acid

When 2-hydroxy-3-methoxybiphenylene, 2-hydroxy-3- methylbiphenylene or 2-chloro-3-hydroxybiphenylene is used in place of hydroxybiphenylene in Example 1, 2-hydroxy-3-methoxybiphenylene-1-carboxylic acid, 2-hydroxy-3-methyl-biphenylene-1-carboxylic acid, and 2-hydroxy-3-chlorobiphenylene-1-carboxylic acid are obtained, respectively.

EXAMPLE 11A

The preparation of 2-acetoxy-3-trifluoromethylbiphenylene

A stainless steel lined shaker is charged with 3-acetoxy- biphenylene-2-carboxylic acid (0.002 m.) under a nitrogen atmosphere, the system cooled to Dry Ice temperatures, and sulfur tetrafluoride (ca. 0.01 m.) condensed into the tube. The mixture is then heated at 100° C. for eight hours, cooled, vented, the residual material taken up in ether, filtered, concentrated to residue, and chromatographed on a silica gel column, using an ether-petroleum ether (v./v. 0–10% ether) system as eluant, yielding 2-acetoxy-3-trifluoromethylbiphenylene.

Gentle refluxing of this material is an aqueous methanol solution with sodium bicarbonate, followed by ether extraction of the mixture, yields 2-hydroxy-3-trifluoromethylibiphenylene.

EXAMPLE 11B

The preparation of 2-hydroxy-3-trifluoromethylbiphenylene-1-carboxylic acid 2-hydroxy-3-trifluoromethylbiphenylene (0.001 m.) is carbonated as per Example 1. The residue from the reaction is added slowly to excess ice-cold 2.5 N hydrochloric acid, the precipitate collected, partitioned between ether- aqueous sodium bicarbonate solution, the aqueous layer filtered and acidified, the 2-hydroxy-3-trifluoromethylbiphenylene-1-carboxylic acid collected and dried.

EXAMPLE 12A

The preparation of 2-acetyl-3,6-dimethoxybiphenylene

When 2,7-dimethoxybiphenylene (0.002 m.) is reacted with acetyl chloride (0.002 m.) under the conditions of Example 11 and the mixture worked up sitmilarly, 2-acetyl-3,6-dimethoxybiphenylene is obtained.

EXAMPLE 12B

The preparation of 3,6-dimethoxybiphenylene-2-carboxylic acid

When the product from Example 12A is treated with hypochlorite solution as per Example 3, 3,6-dimethoxybiphenylene-2-carboxylic acid is obtained.

EXAMPLE 12C

The preparation of 3,6-dihydroxybiphenylene-2-carboxylic acid

A mixture of 3,6-dimethoxybiphenylene-2-carboxylic acid (0.001 m.) in $CH_2Cl_2$ (10 ml.) at Dry Ice temperatures is added to boron tribromide (0.001 m.) in the same solvent at the same temperatures, and the mixture allowed to warm to room temperature. Water is added carefully, then ether, and the organic layer separated, dried, and concentrated. Recrystallization from benzene-petroleum ether yields 3,6-dihydroxybiphenylene-2-carboxylic acid.

EXAMPLE 13

The preparation of 2-hydroxy-6-ethyl-biphenylene

A mixture of 6-acetyl-2-hydroxybiphenylene (1.0 g.) (via bicarbonate hydrolysis of the acetoxy compound), potassium hydroxide (2 g.) and 64% hydrazine hydrate (1 ml.) in diethylene glycol (10 ml.) is refluxed gently for one hour, the water and hydrazine boiled away, the remaining mixture kept 3 hours at ca. 180° C., the mixture cooled, excess water added, steam distilled, the pot residues acidified with 2.5 N hydrochloric acid and extracted with ether. The ether extracts are dried, concentrated and the contents chromatographed in a silica gel column using an ether-petroleum ether system (v./v. 0–10% ether) as eluant to yield 2-hydroxy-6-ethylbiphenylene.

EXAMPLE 14

The preparation of 2-methoxy-6-phenoxybiphenylene

When 2-acetxyl-6-methoxybiphenylene is used in place of the 3-methoxy isomer in Example 10A, and hydrolyzed identically, 2-hydroxy-6-methoxybiphenylene is obtained.

EXAMPLE 15

The preparation of 6-acetyl-2-hydroxybiphenylene

A mixture of 2-acetyl-6-methoxybiphenylene (0.2 g.) and pyridine hydrochloride (5 g.) under a nitrogen atmosphere is placed in an oil-bath set at 230° C., kept there five minutes, removed from the bath immediately, cooled and extracted with ether. The ether extracts are washed with water, dried, and chromatographed on a silica gel column using an ether-petroleum ether system as eluant (v./v. 0–60% ether), yielding 6-acetyl-2-hydroxybiphenylene.

EXAMPLE 16A

The preparation of 6-acetyl-2-nitrobiphenylene

A mixture of 2-nitrobiphenylene (0.4 g.), acetyl chloride (0.3 g.) and aluminum chloride (1 g.) in nitrobenzene (50 ml.) is stirred for sixty hours at room temperature. Hydrochloric acid (2.5 N) is added, the nitrobenzene removed by steam distillation, and the residual solid collected, dried, and chromatographed on a silica gel column using an ether-petroleum ether system (v./v. 0–10% E) as eluant to yield 6-acetyl-2-nitrobiphenylene.

When 2-chlorobiphenylene is used in place of 2-methylbiphenylene in the above example, the corresponding 2-acetyl-3-chlorobiphenylene is obtained.

EXAMPLE 16B

The preparation of 2-hydroxy-6-nitrobiphenylene

When 6-acetyl-2-nitrobiphenylene from Example 16A is used in place of 3-methoxy-2-acetylbiphenylene in Example 10A, 2-hydroxy-6-nitrobiphenylene is obtained.

EXAMPLE 17A

The preparation of 2-benzoyl-6-chlorobiphenylene

A mixture of 2-benzoylbiphenylene (0.55 g.), iodine monochloride (1 g.) and acetic acid (30 ml.) is heated at gentle simmer for six hours, cooled, excess water and sodium hydrogen sulphite added, and the mixture extracted with ether. The ether mixture is washed with aqueous sodium bicarbonate solution, then water, dried over anhydrous magnesium sulfate, filtered, and the ether solution contents chromatographed on a silica gel column using an ether-petroleum system (v./v. 0–20% ether) as eluant, yielding 2-benzoyl-6-chlorobiphenylene.

EXAMPLE 17B

The preparation of 6-chloro-2-hydroxybiphenylene

When 2-benzoyl-6-chlorobiphenylene is used in place of 3-methoxy-2-acetylbiphenylene in Example 10A, 6-chloro-2-hydroxybiphenylene is obtained.

EXAMPLE 18A

The preparation of 6-methoxy-biphenylene-2-carboxylic acid

When 2-acetyl-6-methoxybiphenylene is used in place of 2-acetyl-3-methoxybiphenylene in Example 3, 6-methoxybiphenylene-2-carboxylic acid is obtained.

EXAMPLE 18B

The preparation of 6-acetoxybiphenylene-2-carboxylic acid

When 6-methoxybiphenylene-2-carboxylic acid is used in place of 3,6-dimethoxybiphenylene-2-carboxylic acid in Example 12C and the resultant hydroxy compound acetylated as in Example 2, 6-acetoxybiphenylene 2-carboxylic acid is obtained.

EXAMPLE 18C

The preparation of 2-acetoxy-6-trifluoromethylbiphenylene

When 6-acetoxybiphenylene-2-carboxylic acid is used in place of the 3-isomer in Example 11A 2-acetoxy-6-trifluoromethylbiphenylene is obtained, which is then hydrolyzed to the corresponding 2-hydroxyl compound as shown in the same example.

EXAMPLE 19A

The preparation of 2-acetyl-6-methoxy-biphenylene 2-acetyl-6-hydroxybiphenylene (0.001 m.) in 2 N sodium hydroxide solution (5 ml.) is treated with dimethyl sulfate in small portions until the tlc of a worked-up aliquot shows no phenol remaining. The mixture is neutralized with dilute sulfuric acid, extracted with ether, then washed and dried (magnesium sulfate) extracts chromatographed on silica gel using an ether-petroleum ether system (v./v. 0–15% ether) as eluant yielding 2-acetyl-6-methoxy-biphenylene.

EXAMPLE 19B

The preparation of oxime of 2-acetal-6-methoxybiphenylene

A mixture of 2-acetyl-6-methoxybiphenylene (1 g.), hydroxylamine hydrochloride (1 g.) and pyridine (6 ml.) is heated on the steam cone for four hours under a nitrogen atmosphere. The cooled mixture is added to stirred icewater (100 ml.), stirred until the mixture reaches room temperature, filtered, the residue taken up in excess chloroform, washed, dried and concentrated to the oxime which is used as is in Example 30.

EXAMPLE 19C

The preparation of 2-amino-6-methoxybiphenylene

The oxime from Example 19B (0.9 g.) is added to polyphosphoric acid (30 g.) and the mixture kept on the steam bath, protected from moisture, for 30 minutes. After cooling, the viscous mixture is added to water, the aqueous mixture extracted with ether-ethyl acetate (1:1), washed and dried, and the organic layer concentrated to dryness. Chromatography of the residue on a silica gel column using an ether-petroleum ether system as eluant (v./v. 10–100% ether) yields 2-acetamido-6-methoxybiphenylene.

Heating the above amide in water (50 ml.) concentrated hydrochloric acid (50 ml.)-ethanol (10 cc.) at gentle reflux on the steam cone, followed by extraction of neutral material with chloroform yields 2-amino-6-methoxy-biphenylene on neutralization of the aqueous layer with dilute sodium hydroxide solution.

EXAMPLE 19D

The preparation of 2-methoxy-6-phenylbiphenylene

A mixture of 2-amino-6-methoxybiphenylene (0.001 m.), 1-amyl nitrite (0.0012 m.) and benzene (10 ml.) is heated slowly until a vigorous reaction sets in, then refluxed gently for 2 hours. Removal of the solvent and excess reagent in vacuo followed by column chromatography on silica gel using an ether-petroleum ether system as eluant yields 2-methoxy-6-phenylbiphenylene.

EXAMPLE 19E

The preparation of 2-hydroxy-6-phenylbiphenylene

When 2-methoxy-6-phenylbiphenylene is used in place of 2-acetyl-6-methoxybiphenylene in Example 15, 2-hydroxy-6-phenylbiphenylene is obtained.

EXAMPLE 20A

The preparation of 2-chloro-6-mercaptobiphenylene

To a cooled solution of 2-chloro-6-hydroxybiphenylene (0.006 m.) in 4.5 ml. of dimethylformamide is added in small portions sodium hydride (0.006 m. of a 50% mineral oil dispersion). After hydrogen evolution has ceased the mixture is cooled to 10° C. and dimethylthiocarbamoyl chloride (0.008 m.) is added all at once. After the initial reaction has subsided, the mixture is heated slowly to 80° C., the mixture cooled and poured into 20 ml. of potassium hydroxide (1%) solution. The aqueous mixture is saturated with sodium chloride and extracted with benzene, the benzene washed well with water, dried over magnesium sulfate, filtered, and concentrated in vacuo to the crude thiocarbamate.

The thiocarbamate is then heated under a nitrogen atmosphere for 20 minutes at 250° C., the crude rearranged compound cooled, taken up in methanol containing excess 10% sodium hydroxide solution (de-aerated), and the resultant mixture heated under a nitrogen atmosphere until tlc indicates no S-biphenylenyl thiocarbamate remains. The mixture is cooled, acidified with 2.5 N hydrochloric acid, extracted with benzene, the benzene extracts dried, filtered, and concentrated. Chromatography of the material obtained from the benzene solution on a silica gel column, using an ether-petroleum ether system (v./v. 0–40% ether) as eluant, yields 2-chloro-6-mercaptobiphenylene.

EXAMPLE 20B

The preparation of 2-chloro-6-methylthiobiphenylene

When 2-chloro-6-mercaptobiphenylene is used in place of 2-acetyl-6-hydroxybiphenylene in Example 19A, and using de-aerated sodium hydroxide solution to prevent extensive disulfide formation, 2-chloro-6-methylthiobiphenylene is obtained.

EXAMPLE 20C

The preparation of 2-cyano-6-methylthiobiphenylene

A mixture of 2-chloro-6-methylthiobiphenylene (0.002 m.), cuprous cyanide (0.003 m.) and N-methylpyrrolidone is de-aerated, covered with a nitrogen atmosphere, and heated slowly to 180° C., kept at this temperature 3 hours, allowed to cool, partitioned between benzene-7% hydrochloric acid containing ferric chloride (0.004 m.), the benzene layer separated, dried, concentrated and the the residue chromatographed on a silica gel column using an ether-petroleum ether system (v./v. 0–40% ether) as eluant to yield 2-cyano-6-methylthiobiphenylene.

EXAMPLE 20D

The preparation of 6-methylthiobiphenylene-2-carboxylic acid

A mixture of the above cyano compound (0.001 m.), acetic acid (5 ml.) and 20% hydrochloric acid (5 ml.) is heated on the steam cone for eight hours. The cooled mixture is then extracted well with ether, the ether layer separated and extracted with sodium bicarbonate solution, and the aqueous layer acidified and 6-methylthiobiphenylene-2-carboxylic acid collected.

EXAMPLE 20E

The preparation of 3-hydroxy-6-methylthiobiphenylene-2-carboxylic acid

An aqueous solution of cupric sulfate (0.001 m.) is added to an agitated solution of sodium hydroxide (0.002 m.) and 6-methylthiobiphenylene-2-carboxylic acid (0.001 m.) in water (5 ml.). The salt formed is collected after one hour, washed with water, and dried. Rearrangement is affected by suspending the salt in dry nitrobenzene (4 ml.), immersing the mixture in an oil bath at 230° C., and refluxing the mixture under a nitrogen atmosphere, and agitating for thirty minutes. On cooling, excess ether is added, the mixture filtered, the residue digested in concentrated ammonium hydroxide solution, filtered, the filtrate acidified, extracted with ether and the ether extracts combined with the original ether filtrate. The ether solution is washed with dilute hydrochloric acid, water, and then extracted with sodium bicarbonate solution. Acidification yields a mixture of the starting acid and 3-hydroxy-6-methylthiobiphenylene-2-carboxylic acid, purified via chromatography of its methyl ester or via extraction with ferric chloride solution.

EXAMPLE 20F

The preparation of 3-hydroxy-6-mercaptobiphenylene-2-carboxylic acid

When 3-hydroxy-6-methylthiobiphenyl-2-carboxylic acid is used in place of 3,6-dimethoxybiphenylene-2-carboxylic acid in Example 12C and the resulting material purified via chromatography of the methyl ester (prepared via procedure of Example 5), 3-hydroxy-6-mercaptobiphenylene-2-carboxylic acid is obtained.

EXAMPLE 21

The preparation of 3-hydroxy-6-methylsulfinyl-biphenylene-2-carboxylic acid

To a cooled solution of 3-hydroxy-6-methylthiobiphenylene-2-carboxylic acid (0.001 m.) in methanolacetone is added a solution of sodium metaperiodate (0.001 m.) in a minimum of water, and the mixture stirred at or below room temperature until the precipitation of sodium iodate is completed. The iodate is removed by filtration, the solvents removed in vacuo, and the residue taken up in chloroform and ether, the organic solvents combined and concentrated. Purification is affected via chromatography of the methyl ester or recrystallization of the acid, yielding 3 - hydroxy - 6-methylsulfinylbiphenylene-2-carboxylic acid.

EXAMPLE 22

The preparation of 3-hydroxy-6-methylsulfonyl-biphenylene-2-carboxylic acid

When two equivalents of sodium metaperiodate are used in Example 21, and the reaction carried out at 50–

60° C., there is obtained 3-hydroxy-6-methylsulfonylbiphenylene-2-carboxylic acid.

EXAMPLE 23

The preparation of salicyclic acids

When 6 - ethyl - 2 - hydroxybiphenylene, 6 - methoxy-2-hydroxybiphenylene, 6 - acetyl - 2 - hydroxybiphenylene, 6 - nitro - 2 - hydroxybiphenylene, 6 - chloro - 2 - hydroxybiphenylene, and 6 - phenyl-2-hydroxybiphenylene are used in place of 2-hydroxybiphenylene in Example 1, the corresponding 7-substituted salicyclic acids are obtained.

When 6-trifluoromethyl12-hydroxybiphenylene is used in place of the 3-isomer in Example 11B the corresponding salicyclic acid is obtained.

EXAMPLE 24

The preparation of 3,6-diacetoxybiphenylene-2-carboxylic acid

When 3,6-dihydroxybiphenylene - 2 - carboxylic acid (0.008 m.) is used in place of 1-hydroxybiphenylene-2-carboxylic acid in Example 2, and an additional equivalent of both pyridine and acetic anhydride added, 3,6-diacetoxybiphenylene-2-carboxylic acid is obtained.

EXAMPLE 25

The preparation of 7-cyano-3-hydroxybiphenylene-2-carboxylic acid

When 7-chloro-3-hydroxybiphenylene - 2 - carboxylic acid is used in place of 2-chloro-6-methylthiobiphenylene in Example 20C there is obtained 7-cyano-3-hydroxybiphenylene-2-carboxylic acid.

EXAMPLE 26

The preparation of 3-hydroxy-2,6-biphenylenedicarboxylic acid

When 7-cyano-3-hydroxybiphenylene - 2 - carboxylic acid is used in place of 2-cyano - 6 - methylthiobiphenylene in Example 20D there is obtained 3-hydroxy-2,7-biphenylenedicarboxylic acid.

EXAMPLE 27

The preparation of 3-hydroxy-2,7-dicarbomethoxybiphenylene

When 3 - hydroxybiphenylene - 2,7 - dicarboxylic acid is used in place of 3 - hydroxybiphenylene-2-carboxylic acid in Example 5, 3-hydroxy-2,7-dicarbomethoxybiphenylene is obtained.

EXAMPLE 28

The preparation of 6-benzyloxy-3-hydroxybiphenylene-2-carboxylic acid

A mixture of 3,6 - dihydroxybiphenylene-2-carboxylic acid (0.001 m.), anhydrous potassium carbonate (0.002 m.) and methanol (5 ml.) is stirred at room temperature for 0.5 hour, protected by a calcium chloride drying tube. Benzyl chloride (0.002 m.) is then added, and the mixture refluxed for four hours. A solution of potassium hydroxide (0.004 m.) in water (5 ml.) is added, and the mixture heated on the steam cone for one hour, cooled, filtered, and acidified. The collected 6-benzyloxy-3-hydroxybiphenylene-2-carboxylic acid is purified via recrystallization or chromatography of its methyl ester.

EXAMPLE 29

The preparation of 6-benzyl-2-methoxybiphenylene

When 6-benzoyl-2-methoxybiphenylene is used in place of 6 -acetyl - 2 - hydroxybiphenylene in Example 13, 6-benzyl-2-methoxybiphenylene is obtained.

When 6-benzyl-2-methoxybiphenylene is heated with phenylene-2-carboxylate obtained acetylated as per Example 15, 6-benzyl-2-hydroxybiphenylene is obtained.

EXAMPLE 30A

The preparation of methyl 6-acetyl-3-methylbiphenylene-2-carboxylate

When 2-acetyl-3-methylbiphenylene is treated with sodium hypochlorite as per Example 3, the resulting acid esterified as per Example 5, and the methyl 3-methylbiphenylene2-carboxylate obtained acetylated as per Example 16A, there is obtained methyl 6-acetyl-3-methylbiphenylene-2-carboxylate upon chromatography of the resultant mixture on a silica gel column, using an ether-petroleum system (v./v. 0–50% ether) as eluant.

EXAMPLE 30B

The preparation of 2-acetyl-7-methylbiphenylene

A mixture of methyl 6-acetyl-3-methylbiphenylene-2-carboxylate (0.005 m.), potassium hydroxide (0.0055 m.) in a minimum amount of water, and 1,2-dimethoxyethane is stirred and warmed slightly for several hours, the mixture diluted with water, extracted twice with ether, the layers separated, the aqueous layer filtered and acidified to yield 6-acetyl-3-methylbiphenylene-2-carboxylic acid.

The above acid is heated in refluxing quinoline with a trace of the copper (II) salt of the acid (prepared from the acid salt and cupric sulfate in aqueous solution), the quinoline removed in vacuo, the residue taken up in ether, washed with sodium carbonate solution, water, 1 H hydrochloric acid, dried over magnesium sulfate, filtered, and concentrated to a residue. Chromatography on a silica gel column using an ether-petroleum ether (v./v. 0–40% ether) system as eluant yields 2-acetyl-7-methylbiphenylene.

EXAMPLE 30C

The preparation of 2-acetoxy-7-methylbiphenylene

When 2-acetyl-6-methylbiphenylene is used in place of 2-acetyl-3-methoxybiphenylene in Example 10A, and the hydrolysis omitted, there is obtained 2-acetoxy-7-methylbiphenylene.

EXAMPLE 30D

The preparation of 2-acetoxy-7-bromomethylbiphenylene

A mixture of 2-acetoxy-7-methylbiphenylene (0.005 m.), N-bromosuccinimide (0.005 m.), carbon tetrachloride (50 ml.) and dibenzoyl peroxide (trace) is refluxed gently for two hours, succinimide removed by filtration, the filtrate concentrated in vacuo to crude 2-acetoxy-7-bromomethylbiphenylene, used as-is in Example 52.

EXAMPLE 30E

The preparation of 2-hydroxy-7-methoxymethylbiphenylene

The above bromomethyl compound (0.01 m.) is added gradually to a stirred solution of sodium methoxide (0.002 m.) in methanol (10 ml.). After addition, the mixture is refluxed gently for one hour, water (30 ml.) added, 2 N hydrochloric acid added until the mixture is slightly acidic, the aqueous mixture extracted well with ether, and the ether soluble material chromatographed on a silica gel column to yield 2-hydroxy-7-methoxymethylbiphenylene.

When potassium methylmercaptide is used in place of sodium methoxide, the 7-methylthiomethyl analog is obtained.

EXAMPLE 31

The preparation of 2-fluoro-6-hydroxybiphenylene

When 2-hydroxy-6-methoxylbiphenylene is reacted with sulfur tetrafluoride under the conditions of Example 13, 2-fluoro-6-methoxybiphenylene is obtained.

When this compound is demethylated via the procedure of Example 15, 2-fluoro-6-hydroxybiphenylene is obtained.

EXAMPLE 32

The preparation of biphenylenecarboxylic acids

When 6-benzyl-2 - hydroxybiphenylene, 7 - methoxymethyl-2-hydroxybiphenylene, 7-methylthiomethyl-2 - hydroxybiphenylene, and 6-fluoro-2-hydroxybiphenylene are used in place of 2-hydroxybiphenylene in Example 1, the corresponding biphenylene-carboxylic acids are obtained.

EXAMPLE 33A

The preparation of 7-amino-3-hydroxybiphenylene-2-carboxylic acid

A mixture of 3-hydroxy-7-nitrobiphenylene-2-carboxylic acid (0.003 m.), ethanol (15 ml.), concentrated hydrochloric acid (30 ml.) and stannous chloride (7.5 g.) is refluxed for 1 hour, made neutral with sodium bicarbonate solution, concentrated in vacuo to dryness, and the dry residue extracted in a Sohlet extractor with chloroform. Evaporation of the chloroform solution yields crude 7-amino-3-hydroxybiphenylene-2-carboxylic acid, which is purified via chromatography of the methyl ester, prepared via procedure of Example 5, using a silica gel column and a methanol-methylene chloride system (v./v. 0–20% methanol) as eluant.

EXAMPLE 33B

The preparation of 7-acetamido-3-acetoxybiphenylene-2-carboxylic acid

When 7-amino-3-hydroxybiphenylene-2-carboxylic acid is reacted with acetic anhydride and pyridine as per Example 24, 7-acetamido-3-acetoxybiphenylene-2-carboxylic acid is obtained.

EXAMPLE 34

The preparation of methyl 7-dimethylamino-3-hydroxybiphenylene-2-carboxylate A mixture of methyl 7-amino-3-hydroxybiphenylene-2-carboxylate (0.001 m.) and dimethyl sulfate (0.002 m.) is placed in an oil bath set at 60° C., heated slowly to 135° C., kept 5 hours, cooled, added to dilute hydrochloric acid with stirring, the mixture filtered and neutralized with sodium bicarbonate solution, extracted well with chloroform, and the chloroform contents chromatgraphed on a silica gel column using a methanol-methylene chloride system (v./v. 0–20% methanol) as eluant yielding methyl 7-dimethylamino-3-hydroxybiphenylene-2-carboxylate.

EXAMPLE 35A

The preparation of 2-hydroxy-7-hydroxymethylbiphenylene

A mixture of 2-acetoxy-7-bromomethylbiphenylene (0.001 m.), silver acetate (0.0011 m.) and acetic acid (3 ml.) is heated gently for three hours, filtered, the filtrate added to dilute sodium hydroxide solution (excess), heated, filtered and acidified, the mixture extracted well with ether, and the ether solution chromatographed on a silica gel column using an ether-petroleum ether system (v./v. 0–50%) as eluant, to yield 2-hydroxy-7-hydroxymethylbiphenylene. When the bromoethyl compound is heated in aqueous sodium hydroxide solution and purified as above, the hydroxy-methyl compound is obtained directly.

When potassium thiolacetate, is used in place of silver acetate in the above reaction, 2-hydroxy-7-mercaptomethylbiphenylene is obtained.

EXAMPLE 35B

The preparation of 3-hydroxy-6-hydroxymethylbiphenylene-2-carboxylic acid and 3-hydroxy-7-mercaptomethylbiphenylene-2-carboxylic acid When 2-hydroxy-7-hydroxymethylbiphenylene and 2-hydroxy-7-mercaptomethylbiphenylene are used in place of 2-hydroxybiphenylene in Example 1, the corresponding carboxylic acids are obtained.

EXAMPLE 36A

The preparation of 2-dimethylaminomethyl-7-hydroxybiphenylene 2-acetoxy-7-bromomethylbiphenylene (0.002 m.) is heated in methanolic dimethylamine, the solvents removed in vacuo, the residue taken up in 2.5 N hydrochloric acid, filtered, acidified, and the resultant 2-dimethylaminomethyl-7-hydroxybiphenylene collected.

When methanolic ammonia is used in place of the dimethylamine in the above reaction, the corresponding 6-aminomethyl-2-hydroxybiphenylene is obtained.

EXAMPLE 36B

The preparation of 6-dimethylaminomethly-3-hydroxybiphenyl-3-carboxylic acid and 6-aminomethyl-3-hydroxybiphenylene-2-carboxylic acid When 2-dimethylaminomethyl-7 - hydroxybiphenylene and 2-aminomethyl-7-hydroxybiphenylene are used in place of 2-hydroxybiphenylene in Example 1, the corresponding carboxylic acids are obtained.

EXAMPLE 37

The preparation of 6-carbamyl-3-hydroxybiphenylene-2-carboxylic acid

A mixture of 7-cyano-3-hydroxybiphenylene-2-carboxylic acid (0.002 m.) and polyphosphoric acid (5 ml.) is heated on a steam cone for two hours, cooled, added to iced water, the aqueous mixture extracted well with chloroform, the chloroform layer dried and the solvent removed in vacuo to yield 7-carbamyl-2-hydroxybiphenylene-3-carboxylic acid.

EXAMPLE 38A

The preparation of 2-methoxy-6-phenoxybiphenylene

A mixture of the potassium salt of 2-hydroxy-6-methoxy-biphenylene (0.005 m.), bromobenzene (0.006 ml) and copper bronze (0.01 g.) is heated at 210° C. for 5 hours. The mixture is cooled, extracted well with ether and chloroform, and the organic extracts chromatographed on a silica gel column using an ether-petroleum ether system (v./v. 0–50% ether) as eluant to yield 2-methoxy-6-phenoxybiphenylene.

EXAMPLE 38B

The preparation of 2-hydroxy-6-phenoxybiphenylene

When 2 - methoxy - 6 - phenoxybiphenylene is heated with pyridine hydrochloride as per Example 15, 2-hydroxy-6-phenoxybiphenylene is obtained.

EXAMPLE 39A

The preparation of 2,3-dimethoxy-6-hydroxybiphenylene

When 2,3-dimthoxybiphenylene is acetylated as per Example 16A and the resulting 2,3-dimethoxy-6-acetylbiphenylene oxidized as per Example 10A 2,3-dimethoxy-6-hydroxybiphenylene is obtained.

EXAMPLE 39B

The preparation of 6,7-dimethoxy-3-hydroxybiphenylene-2-carboxylic acid and 7-phenoxy-3-hydroxybiphenylene-2-carboxylic acid When 2,3-dimethoxy-6-hydroxybiphenylene and 2-hydroxy-6-penoxybiphenylene are carbonated using the procedure of Example 1, the corresponding o-hydroxy carboxylic acids are obtained.

We claim:
1. A compound of the formula:

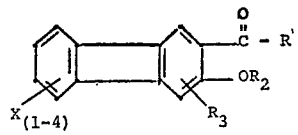

wherein:
R is hydroxy or loweralkoxy;
$R_2$ is hydrogen or loweralkyl;
$R_3$ is selected from the group of hydrogen, halogen, haloloweralkyl, loweralkyl, cycloloweralkyl, and loweralkoxy; and
X is selected from the group of hydrogen, loweralkyl, hydroxy, loweralkoxy, halogen, haloloweralkyl, nitro, amino, loweralkylamino, diloweralkylamino, mercapto, loweralkylmercapto, loweralkylsulfonyl, sulfonylamido, aminoloweralkyl, loweralkylamino-loweralkyl, hydroxyloweralkyl, alkoxyloweralkyl, mercaptoloweralkyl, loweralkylmercaptoloweralkyl, cyano, carboxy, carboalkoxy, carbamoyl, and benzyl; and
the pharmaceutically acceptable non-toxic acid addition salts thereof; provided that the $OR_2$ group is always ortho to the

group.

2. A compound of the formula:

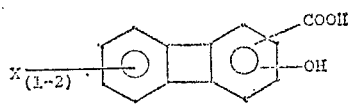

wherein X is hydrogen provided that the hydroxy group is always ortho to the carboxy group.

3. 3-hydroxybiphenylene-2-carboxylic acid according to claim 1.

4. 7-chloro-3-hydroxybiphenylene-2-carboxylic acid according to claim 1.

5. 7-fluoro-3-hydroxybiphenylene-2-carboxylic acid according to claim 1.

6. 7-methoxy-3-hydroxybiphenylene-2-carboxylic acid according to claim 1.

7. 7 - trifluoromethyl - 3 - hydroxybiphenylene - 2-carboxylic acid according to claim 1.

References Cited

Lindsey et al. Chem. Rev. V57 #4(1957) pp. 583–587.

LORRAINE A. WEINBERGER, Primary Examiner

E. J. GLEIMAN, Assistant Examiner

U.S. Cl. X.R.

260—247.1, 247.7 A, 294.7, 326.5 S, 326.5 N, 465 D, 470, 471 R, 472, 473 F, 476 C, 479 S, 501.11, 501.17, 516, 519, 559 S, 559 T, 566 A; 424—248, 267, 274, 308, 309, 316, 317, 324

UNITED STATES PATENT OFFICE
CERTIFICATE OF CORRECTION

Patent No. 3,641,134        Dated Feb. 8, 1972

Inventor(s) Tsung-Ying Shen, Bruce E. Witzel & Gordon L. Walford

It is certified that error appears in the above-identified patent and that said Letters Patent are hereby corrected as shown below:

Column 3, line 22, "mg." should read -- gm. --; Column 4, line 15 "as", second occurrence, should read -- to give --.

In Column 7, line 38, "2-methoxy-6-phenoxybiphenylene" should be --- 2-hydroxy-6-methoxybiphenylene ---;

In Column 11, line 74, "phenylene-2-carboxylate obtained acetylated as per" should be ---pyridine hydrochloride according to the procedure of---;

In Column 12, line 28, the letter "H" should be ---N---;
In Column 12, line 56, "(0.01 m.)" should be ---(0.001 m.)---
In Column 13, line 59, "0-50%)" should be --- 0-50% ether)---
In Column 16, line 1, the word "hydrogen" should be ---halogen---.

Signed and sealed this 18th day of July 1972.

(SEAL)
Attest:

EDWARD M. FLETCHER, JR.        ROBERT GOTTSCHALK
Attesting Officer              Commissioner of Patents